United States Patent [19]

Karcey

[11] Patent Number: 4,622,136
[45] Date of Patent: Nov. 11, 1986

[54] REUSABLE LIQUID FILTER ASSEMBLY
[75] Inventor: Jon Karcey, Makawao, Hi.
[73] Assignee: Watson Karcey International, Greenwich, Conn.
[21] Appl. No.: 769,859
[22] Filed: Aug. 23, 1985
[51] Int. Cl.⁴ ............................................ B01D 29/04
[52] U.S. Cl. .................... 210/168; 210/416.4; 210/416.5; 210/419; 210/420; 210/430; 210/431; 210/432
[58] Field of Search .................. 210/168, 416.5, 416.4, 210/418, 419, 420, 429, 430, 431, 432

[56] References Cited
U.S. PATENT DOCUMENTS

| Re. 24,509 | 7/1958 | Buckman | 210/487 |
|---|---|---|---|
| 217,126 | 7/1879 | Loudon . | |
| 401,057 | 4/1889 | Perkins . | |
| 539,800 | 5/1895 | Durant . | |
| 1,165,640 | 12/1915 | Utz et al. . | |
| 1,677,118 | 7/1928 | Ford . | |
| 1,906,984 | 5/1933 | Lyman . | |
| 2,011,031 | 8/1935 | Birch | 210/164 |
| 2,430,578 | 11/1947 | Matlock | 210/183 |
| 2,798,695 | 7/1957 | Arleque | 257/263 |
| 2,995,250 | 8/1961 | Boewe et al. | 210/130 |
| 3,000,505 | 9/1961 | Scavuzzo | 210/132 |
| 3,036,711 | 5/1962 | Wilhelm | 210/130 |
| 3,199,679 | 8/1965 | Salyer, Jr. | 210/259 |
| 3,224,591 | 12/1965 | Sawyer | 210/440 |
| 3,265,213 | 8/1966 | Decker et al. | 210/136 |
| 3,327,864 | 6/1967 | Ball et al. | 210/457 |
| 3,463,317 | 8/1969 | Prier | 210/152 |
| 3,519,560 | 7/1970 | Taylor | 210/316 |
| 3,633,753 | 1/1972 | Petitjean | 210/356 |
| 3,868,327 | 2/1975 | Van Gilder et al. | 210/457 |
| 4,052,307 | 10/1977 | Humbert, Jr. | 210/130 |
| 4,207,187 | 6/1980 | Booth | 210/130 |
| 4,222,875 | 9/1980 | Sikula | 210/429 |
| 4,316,802 | 2/1982 | Howell | 210/95 |

Primary Examiner—Frank Sever
Attorney, Agent, or Firm—St. Onge Steward Johnston & Reens

[57] ABSTRACT

A reusable liquid filter assembly, such as an oil filter, is provided comprising a housing with inlet and outlet ports, filter means removably mounted inside the housing, means for holding the filter means inside the housing having tapered lengthwise slots for increased liquid flow, bypass valve means for providing a passageway between the inlet and outlet ports when the liquid pressure exceeds a predetermined value, means for alternately sealing and opening the housing to remove or insert the filter means, and a plurality of gasket means for permitting the filter assembly to be cooperable with a plurality of engines. An internally threaded nipple is also provided for insertion into the outlet port for changing the size thereof to permit use on a plurality of engines.

17 Claims, 2 Drawing Figures

REUSABLE LIQUID FILTER ASSEMBLY

BACKGROUND OF THE INVENTION (1) Field of the Invention

The present invention relates to a reusable liquid filter assembly and more particularly to a reusable liquid filter assembly for use with an engine for discharging filtered liquid to the engine. In a preferred embodiment, the filter assembly is a reusable oil filter for mounting on or near an internal combustion engine.

(2) Description of the Prior Art

Filter units for filtering liquid, such as oil or fuel, are known in the art. An oil filter unit is typically placed in the oil line of an internal combustion engine to remove grit and other contaminants from the lubricating oil to provide longer engine life and improved engine performance.

The typical oil filter unit has a cannister or housing for coupling to the engine with a filter element therein for filtering the oil as it circulates through the cannister. The cannister ordinarily has one end adapted for coupling onto the engine block of the internal combustion engine by means of an internally threaded nipple that threads onto a corresponding externally threaded nipple or matching connecting configuration on the block. Oil inlet holes surround the nipple for receiving oil from the engine, and filtered oil is returned to the engine through the nipple. A gasket surrounds the inlet holes and the nipple to seal the unit against the block.

After the filter unit has been in the oil line for a certain period of operation, approximately 2,000 miles or so for the typical engine operated under routine conditions, the gradual accumulation of grit and other contaminants in the filter element begins to reduce the efficiency and effectiveness of the filter unit and also provide increasing resistance to oil flow therethrough.

If the resistance to oil flow reaches a predetermined level, a pressure sensitive bypass valve is activated so that the oil bypasses the filter element and is returned essentially unfiltered to the engine. It is important for the operation and longevity of the engine that the filter unit be replaced or serviced before this valve is actuated and the engine is lubricated by unfiltered oil. However, were it not for the bypass valve, the filter element might clog, oil flow through the filter unit and likewise through the engine would cease, and oil starvation accompanied by engine failure would result.

Disposable or throw-away type oil filter units are known in the prior art. U.S. Pat. No. 3,265,213 to Decker et al. discloses such a filter unit. When the filter element has become clogged, the entire unit is removed and discarded, and a new unit is put in its place. This type of filter unit is relatively expensive in that a whole new unit must be used each time the filter unit is serviced, even though only the filter element itself has been expended and the other parts of the filter unit have not yet exceeded their useful life.

Also, with such a disposable filter unit, the filter element and bypass valve are sealed therein, and it is not easy to determine when the element has become clogged. It is possible for the filter to be completely expended after only 1,500 miles of engine operation, whereas the recommended procedure for the typical internal combustion engine calls for oil filter unit changes approximately only every 5,000 to 6,000 miles. It is also possible, due to faulty manufacturing or mishandling, for the bypass valve to become lodged in the "open" position even when the filter is new, thereby giving no oil filtering protection at all. Because the filter unit is completely sealed, it can be difficult to determine whether the bypass valve is operating properly.

An oil filter unit having a detachable cover permitting replacement of the filter element itself is known in the art. U.S. Pat. No. 3,036,711 to Wilhelm shows such a filter unit.

The prior art oil filter units are disadvantageous in that expense is increased, because the entire filter unit or the filter element itself must be periodically replaced with a new unit or element. Also, the flow of oil through the filter element may be restricted because of the manner in which the filter element is mounted inside the filter unit. It also may not be readily determinable by visual inspection whether the bypass valve is operating properly.

Furthermore, the oil filter units of the prior art are typically manufactured to fit only one type or several limited types of engines. The internally threaded nipples vary in diameter and thread size, the filter unit itself may vary in size and shape, and the coupling on the engine block with which the unit must mate may vary in size and shape. Such filter units are therefore not readily interchangeable between different internal combustion engines. Accordingly, a dealer or service station operator ordinarily must keep a variety of types and sizes of oil filter units in stock.

SUMMARY OF THE INVENTION

In accordance with the present invention, a reusable liquid filter assembly for an engine is provided for receiving liquid from the engine and discharging filtered liquid to the engine, the filter assembly comprising a housing with inlet and outlet ports, filter means removably mounted inside the housing, means for holding the filter means inside the housing having tapered lengthwise slots for increased liquid flow, bypass valve means for providing a passageway between the inlet and outlet ports when the liquid pressure exceeds a predetermined value, means for alternately sealing and opening the housing to permit insertion or removal of the filter means, and a plurality of gasket means for permitting the filter assembly to be sealingly cooperable with a plurality of engines.

More specifically, the holding means comprises a filter sleeve for mounting inside the housing on a substantially rigid support frame, the frame forming a plurality of tapered lengthwise slots for enhancing the liquid flow through the filter screen. The support frame and filter sleeve are removable through an opening in the housing.

The housing may also have a centrally located outlet port comprising an internally threaded nipple, and a threaded insert means is provided for insertion into the threaded nipple for changing the size of the outlet port to be cooperable with a plurality of engines.

The support frame may have a chamfer on at least one end to enhance the mounting or demounting of the filter sleeve from the support frame.

The housing may have oval shaped inlet ports for enhancing the rate of liquid flow. The housing may further comprise a plurality of spaced apart cooling fins positioned lengthwise on the exterior of the housing sidewall.

The bypass valve means may also comprise means for changing the predetermined value of liquid pressure that opens the bypass valve.

It is an object of the present invention to provide a reusable liquid filter assembly for an engine that can be operated at less expense than the typical prior art filter, in that the filter element can be removed, cleaned and reinserted in the filter unit for reuse a virtually unlimited number of times.

It is a further object of this invention to provide a reusable liquid filter assembly wherein the flow of liquid across the filter element is enhanced and the pressure drop across the filter element is reduced.

It is a further object of the present invention to provide a reusable liquid filter assembly that is interchangeable for use on a plurality of engines having different shapes and sizes of coupling or connecting configuration requirements.

It is a further object of the present invention to provide a reusable liquid filter assembly having a bypass valve that can be readily inspected visually to determine whether the bypass valve is operating properly.

It is a further object of the present invention to provide a reusable liquid filter assembly having an adjustable bypass valve for selecting the pressure at which the bypass valve is opened to permit liquid flow to bypass the filter unit.

It is a further object of the present invention to provide an oil filter assembly that has a filter element that is easily accessible for visual inspections to determine whether any parts of the engine are deteriorating at an undue rate.

Further objects and advantages of the present invention can be seen from the accompanying drawings and detailed description of the preferred embodiment set forth below.

DETAILED DESCRIPTION OF THE PREFERRED EMBODIMENT

Although it is understood that the filter assembly of the present invention can be used for liquids other than oil and for engines other than internal combustion engines, the description of the preferred embodiment is in terms of an oil filter for an internal combustion engine.

Figure 1:
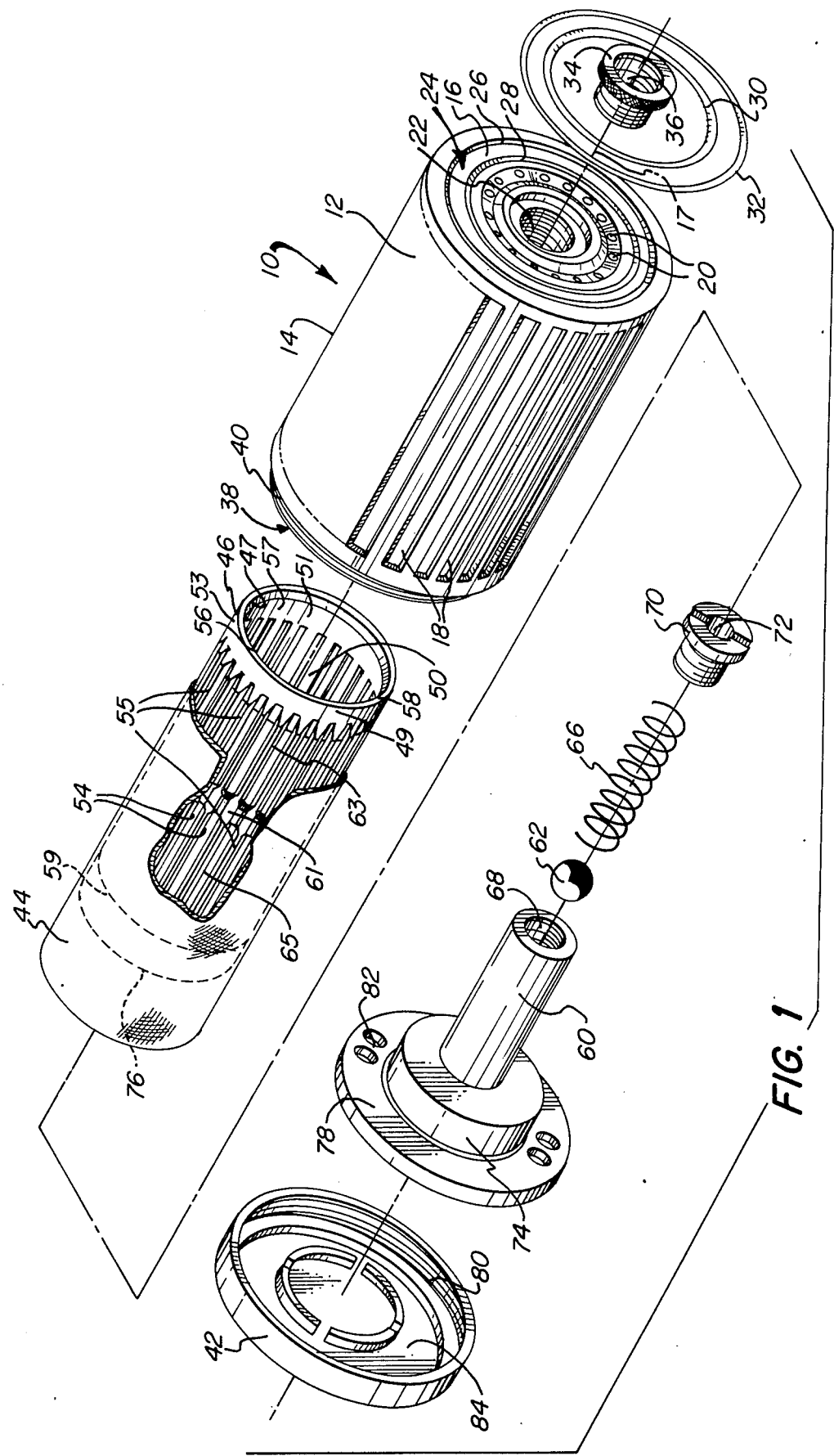
FIG. 1 is an exploded, perspective view of the reusable liquid filter assembly of the present invention.
Figure 2:
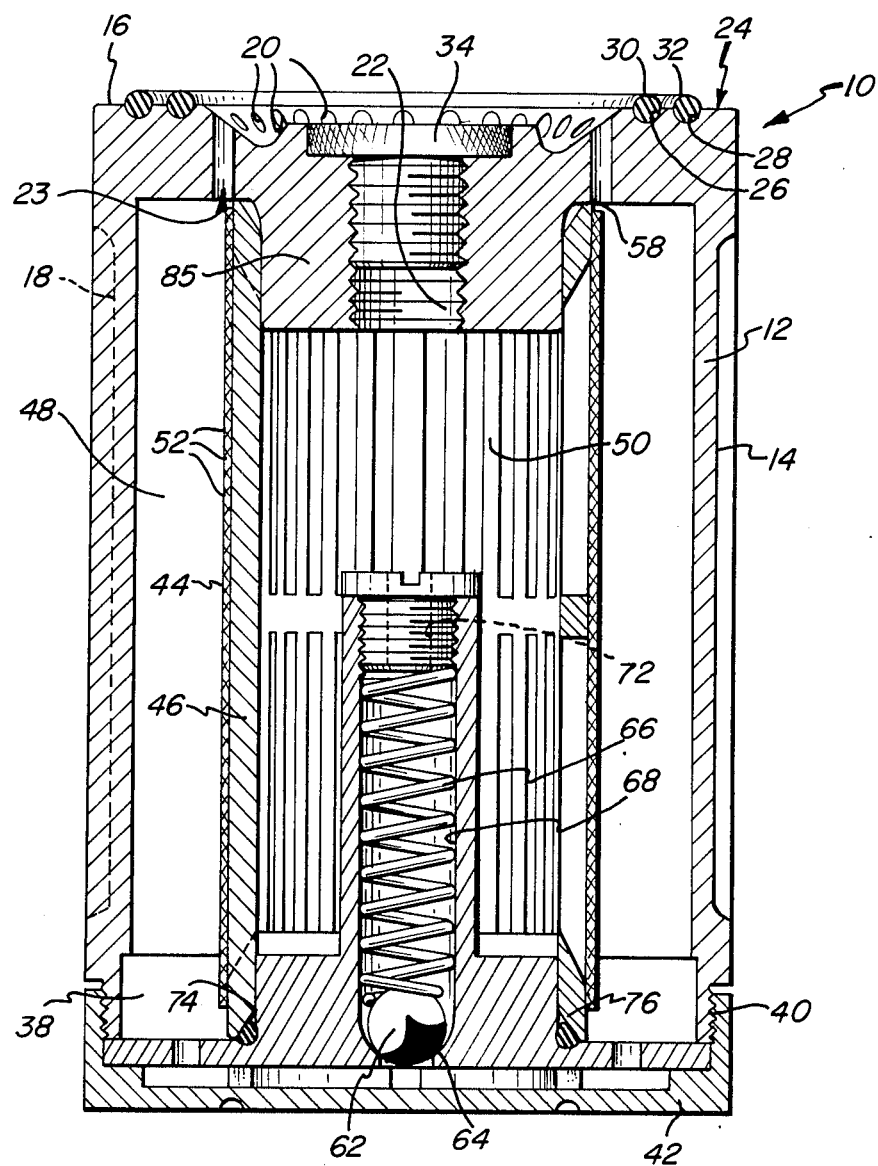
FIG. 2 is a partial cross-sectional view of the assembled reusable liquid filter assembly of the present invention.

Referring now to FIGS. 1 and 2, reference numeral 10 indicates generally the reusable oil filter assembly of the present invention shown in an exploded view. Housing 12 has a tubular sidewall 14 and an endwall 16. Housing 12 is cylindrical with a longitudinal axis 17 running therethrough, and the sidewall 14 as shown in FIG. 1 is substantially cylindrical, although other shapes could also be used. The housing 12 preferably is of metal, such as aluminum or aluminum alloy, that is dimensionally stable and provides a substantially rigid enclosure for the filter components as described below. An appropriate plastic could also be used.

The housing 12 comprises a plurality of cooling fins 18 that are spaced apart on the exterior sidewall 14 around the circumference of sidewall 14. These fins 18 are shown positioned lengthwise on sidewall 14, although these cooling fins could also be positioned around the housing 12. The fins 18 can be formed by exterior casting or by grooving the exterior of sidewall 14 and can be of any well known configuration for enhancing the dissipation of heat from the oil circulating through filter 10.

Endwall 16 of housing 12 is adapted for abutting the internal combustion engine at a mating portion of the engine block (not shown). The oil received from the engine enters filter unit 10 through a plurality of oil inlet ports or holes 20 formed in the endwall 16. The inlet ports 20 are shown in FIGS. 1 and 2 as being substantially circular in cross section; however, the ports 20 can also be oval to provide a greater cross-sectional area for an enhanced rate of oil flow therethrough. The inlet ports 20 can be formed with their center or tubular axes in alignment with the longitudinal axis of the housing; and as described more fully in detail below, the ports 20 preferably are placed adjacent the filter screen for flushing the screen as the oil enters the housing through the ports 20.

The oil inlet ports 20 are shown spaced uniformly around a threaded outlet port 22 aligned with the longitudinal axis 17 of housing 12. This outlet port 22 is centrally located and is for mounting the filter unit on the engine and for discharging filtered oil to the engine.

Endwall 16 has an inner face 23 and an outer face 24. Outer face 24 engages the engine block and has formed therein two concentric, circular gasket grooves 26 and 28, which surround the plurality of inlet ports 20 and the outlet port 22. Grooves 26 and 28 are of a predetermined size and are adapted for receiving two O-ring gaskets or sealing means 30 and 32, which are seated in the grooves 28 and 26. The two gaskets 30 and 32 make the filter unit 10 usable on different sized engines, whereby outer face 24 is sealingly cooperable with a plurality of internal combustion engines. It is understood that more than two gasket grooves and gasket means can be used to make the filter unit of the present invention cooperable with an even greater number of engines.

In FIGS. 1 and 2, grooves 26 and 28 are shown as adapted for receiving two O-rings 30 and 32; however, it is also understood that gasket grooves and gaskets of other configurations could also be used. For example, an annular gasket of square or rectangular cross-section could equally well be used, with a corresponding gasket groove.

Also shown is a threaded insert means 34 for insertion into the threaded nipple of outlet port 22. Insert 34 has an internally threaded bore 36, whereby the size of outlet port 22 can be varied to be cooperable with a plurality of internal combustion engines. A number of different sized threaded inserts 34 can be provided to make the filter unit 10 adaptable to be fitted to an even greater variety of internal combustion engines.

Housing 12 has an open end or opening 38 opposite the endwall 16 and a threaded portion 40 in sidewall 14 surrounding and adjacent to opening 38 for removably mounting a circular endcap 42, described below. Other suitable means for removably mounting endcap 42 may also be used. As described below, housing 12 can be opened or sealed using endcap 42 for servicing filter unit 10.

A filter sleeve 44 adapted for filtering the engine oil is provided for removably mounting concentrically inside the housing 12 on a tubular frame 46 described more fully in detail below. Sleeve 44 divides the interior of housing 12 into two main parts. Sleeve 44 forms an annular chamber 48 inside housing 12 in liquid communication with the plurality of oil inlet holes 20. Sleeve 44 further forms a central cavity 50 in liquid communication with outlet port 22. Sleeve 44 has a size predetermined by the size of housing 12 and is typically of sufficient length to extend from a first region adjacent the inner face 23 of endwall 16 to a second region adjacent the endcap 42.

Sleeve 44 is preferably capable of being stretched to a substantially cylindrical configuration for mounting on frame 46. Sleeve 44 preferably comprises a flexible screen member having a plurality of openings or pores 52 therein for permitting the flow of oil from annular chamber 48 to central cavity 50. Openings 52 have a predetermined size so as to filter the oil by inhibiting the passage therethrough of grit, contaminants, and other foreign materials. Different screens having different size openings or pores can be used depending on the desired performance characteristics of the filter unit.

Filter sleeve 44 slidably abuts and is removably mounted on tubular frame 46. Frame 46 is a substantially rigid cylindrical frame, which can be of any suitable material such as aluminum or aluminum alloy, molded plastic, or the like. Frame 46 is removably positioned concentrically within housing 12 to support sleeve 44 thereon. Frame 46 forms a plurality of tapered lengthwise slots 54 for enhancing the flow of oil through the filter sleeve 44 from annular chamber 48 into the central cavity 50. Each slot 54 is tapered so that a large open area in the frame surface lies adjacent the filter sleeve 44 to reduce the resistance to oil flow through sleeve 44.

In the preferred embodiment, the frame comprises a section of a hollow cylinder 47 having a wall portion 49 with an inner surface 51 and an outer surface 53. The outer surface 53 abuts the filter sleeve 44, which is slidably mounted thereon. The wall portion 49 comprises a plurality of spaced apart ribs 55 that lie substantially parallel to the cylinder axis 17 of the frame 46. These ribs are spaced, preferably uniformly, completely around the circumference of cylinder 47 to form an equal number of lengthwise slots 54 therebetween. Slots 54 extend through the wall portion 49 from outer surface 53 to inner surface 51 to provide a plurality of passageways through wall portion 49. As seen in FIG. 1, ribs 53 are thicker adjacent inner surface 51 than adjacent outer surface 53. Accordingly, slots 54 are wider adjacent the outer surface 53 than adjacent the inner surface 51, and the flow of oil therethrough from the annular chamber into the inner cavity is thereby enhanced.

It is also preferred to form hollow cylinder 47 with a solid wall portion 57 at one end of cylinder section 47 and also a solid wall portion 59 at the opposite end of section 47. Further, a solid wall portion 61 is positioned between the two ends, and a first group 63 of uniformly spaced apart ribs joins portion 57 to center portion 61, and a second group 65 of uniformly spaced apart ribs joins portion 59 to center portion 61. In this manner, the rigidity of frame 46 is enhanced.

The frame 46 is chamfered or has a beveled edge 56 on at least one end to enhance the mounting or demounting of sleeve 44 thereon. Sleeve 44 can be removed from the frame 46 by sliding and can be washed in an appropriate solvent to remove any accumulated grit or contaminants from the screen or sleeve 44. The sleeve is then remounted or slid back onto frame 46, which remounting is facilitated by chamfer 56. One or both ends of frame 46 may be chamfered. Alternatively, the entire screen and frame can be removed as a unit for cleaning.

As seen in FIG. 2, frame 46 is positioned concentrically inside housing 12 by mating a first end 58 of the frame 46 in a snug conforming fit with a central projection 85 on the inner face 23 of endwall 16, said central projection 85 surrounding outlet port 22 and extending inwardly into the central chamber 50. The first end 58 of frame 46 has a predetermined shape so that frame 46 does not obstruct the oil inlet holes 20. The inlet holes 20 are formed parallel with the longitudinal axis 17, and the frame 46 may interfere with the holes 20 unless the frame 46 has a tapered end (not shown in the drawing).

As shown in FIG. 2, the oil inlet holes 20 are formed in the endwall 16 parallel to the longitudinal axis and enter the outer chamber adjacent the first end 58 of frame 46. Accordingly, as the oil enters the outer chamber and flows past the screen on frame 46, the inrushing oil has a tendency to flush the screen. The frame 46 has a predetermined diameter, whereby the frame portion adjacent the inner face 23 does not obstruct the inlet ports 20.

A bypass valve 60 provides an alternate path between the outer chamber 48 and cavity 50 when the sleeve or screen 44 becomes clogged. Bypass valve 60 comprises a check-ball-and-spring mechanism having a check ball 62 held against a valve seat 64 by a biasing spring 66. Ball 62 and spring 66 are held in place in a channel 68 by a retaining screw 70. The check-ball-and-spring mechanism is responsive to the pressure of the oil entering through inlet ports 20 to provide a passageway from inlet ports 20 to the outlet port 22 when the oil pressure exceeds a predetermined value. Screw 70 has a passageway 72 therethrough to permit the inlet port 20 and annular chamber 48 to be in liquid communication with cavity 50 and outlet port 22. Screw 70 can further adjust the tension on biasing spring 66 to raise or lower the pressure at which the check ball 62 is urged downward or compressed against the spring to permit oil flow to bypass filter sleeve 44.

The bypass valve 60 has an inwardly projecting portion 74 for mating in a snug conforming fit with the second end 76 of frame 46. Valve 60 further has a flange portion 78 for positioning across the opening 38 of the housing 12 and mating with sidewall 14 to further define the outer chamber 48. The bypass valve is for positioning across the housing opening 38 and mating with frame 46.

Endcap 42 is circular and has threaded portions 80 for sealingly engaging the threaded portion 40 of housing 12. Endcap 42 when threaded or screwed onto housing 12 secures the bypass valve 60 and the frame 46 with the sleeve 44 thereon in alignment with each other and secured inside the housing 12. The valve flange 78 has at least one aperture 82 formed therein, and the endcap has a space or open bottom 84, so that the oil bypassing the filter sleeve 44 can pass through aperture 82, space 84, and valve 60 into the center cavity 50.

Because the endcap 42 can be easily removed by unscrewing, the bypass valve 60 can be removed for visual inspection to determine whether it is operating properly. By removing endcap 42, the valve 60 and frame 46 with sleeve 44 thereon can be removed for cleaning and subsequent reinsertion.

Although the filter assembly of the present invention has been described in terms of an oil filter unit, it is understood that the filter unit of the present invention can also be used to filter fuel or other liquids as well.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. An automotive filter assembly comprising: means for use with an internal combustion engine, said assembly including means enabling cleaning for reuse, including,
   (a) a housing having a sidewall and an endwall, the housing having at least one liquid inlet port for receiving liquid to be filtered and at least one liquid outlet port for discharging filtered liquid;
   (b) filter means removably mounted inside the housing, the filter means being positioned between the inlet port and the outlet port, the filter means being adapted to filter the liquid passing from the inlet port to the outlet port, said filter means including means for enabling cleaning for reuse a substantial number of times;
   (c) means for holding the filter means inside the housing, the holding means comprising a hollow cylinder having tapered lengthwise slots for permitting the passage of liquid from the inlet port through the filter means to the outlet port;
   (d) valve means in liquid communication with the inlet port and the outlet port, the valve means being responsive to pressure of the liquid entering through the inlet port to provide a passageway from the inlet port to the outlet port when the pressure exceeds a predetermined value; and
   (e) removable means for alternately sealing and opening the housing to permit the removal of the filter means, the holding means, and the valve means, said sealing means including means enabling removal thereof, said filter means including means enabling removal for inspection, cleansing and reuse a substantial number of times.

2. An automotive filter assembly comprising: means for use with an internal combustion engine, said assembly including means enabling cleaned for reuse, including
   (a) a housing having a sidewall and an endwall, the housing having at least one inlet port for receiving oil from the engine and at least one outlet port for discharging filtered oil;
   (b) filter means removably mounted inside the housing, the filter means being positioned between the inlet port and the outlet port, the filter means being adapted to filter the oil passing from the inlet port to the outlet port, said filter means including means for enabling cleaning a substantial number of times;
   (c) means for holding the filter means inside the housing, the holding means comprising a hollow cylinder having tapered lengthwise slots for permitting the passage of oil from the inlet port through the filter means to the outlet port;
   (d) valve means in liquid communication with the inlet port and the outlet port, the valve means being responsive to pressure of the oil entering through the inlet port to provide a passageway from the inlet port to the outlet port when the pressure exceeds a predetermined value; and
   (e) removable means for alternately sealing and opening the housing to permit the removal of the filter means, the holding means, and the valve means, said sealing means including means enabling removal thereof, said filter means including means for enabling removal for inspection, cleaning and reuse a substantial number of times.

3. The reusable oil filter assembly of claim 2, wherein the holding means comprises a section of a hollow cylinder having a wall portion with an inner surface and an outer surface, the outer surface for abutting the filter means, the wall portion comprising a plurality of spaced apart ribs parallel to the cylinder axis, the ribs being spaced around the circumference of the cylinder to form an equal number of lengthwise slots therebetween, said slots extending through the wall portion from the outer surface to the inner surface and providing a plurality of passageways through the wall portion, the ribs being thicker adjacent the inner surface than adjacent the outer surface, whereby the slots are wider adjacent the outer surface than adjacent the inner surface to enhance the flow of oil therethrough.

4. The reusable oil filter assembly of claim 3, wherein the hollow cylinder has a solid wall portion at one end of the section, a solid wall portion at the opposite end of the section, and a solid wall portion positioned between the two ends of the section, and first and second groups of uniformly spaced apart ribs join the solid wall portions at either end to the wall portion between the two ends, whereby the rigidity of the holding means is enhanced.

5. The reusable oil filter assembly of claim 4, wherein the filter means comprises a flexible screen member slidably mounted on the hollow cylinder in slidable abutment with the outer wall, and both solid wall portions have beveled edges around the circumference of the cylinder to enhance the mounting of the flexible screen member on the hollow cylinder.

6. An automotive filter assembly comprising: means for use with an internal combustion engine, said assembly including means enabling cleaning for reuse, including,
   (a) a housing having a tubular sidewall and an endwall, the housing having at least one inlet port for receiving the oil from the engine and at least one centrally located outlet port for discharging filtered oil, the housing further having an opening opposite the endwall and means adjacent the opening for removably mounting a circular endcap;
   (b) a filter sleeve for removably mounting inside the housing, the sleeve having a predetermined size and shape for forming an annular chamber inside the housing, the chamber being in communication with the inlet port, and further forming a central cavity being in communication with the outlet port, the sleeve adapted to filter oil passing from the annular chamber to the central cavity through the sleeve, said filter sleeve including means for enabling cleaning a substantial number of times;
   (c) a substantially rigid support frame for supporting the filter sleeve thereon, the frame for positioning concentrically within the housing, the frame forming a plurality of tapered lengthwise slots for enhancing the passage of oil from the annular chamber through the filter sleeve into the central cavity, the frame with the sleeve mounted thereon being removably through the housing opening;

(d) valve means for positioning across the housing opening and mating with the frame, the valve means being normally closed and being operative to provide an oil passageway from the annular chamber to the central cavity when the oil pressure in the annular chamber exceeds a predetermined value, the valve means being removable through the housing opening; and (e) a circular endcap for mating with the valve means adjacent the housing opening, the endcap for retaining the filter sleeve, the frame, and the valve means inside the housing and for sealingly engaging the open end of the housing, the endcap having means for permitting the passage of oil from the annular chamber to the valve means, the endcap further being removable to permit the filter sleeve, the frame, and the valve means to be removed from the housing through the opening, said endcap including means enabling removal thereof, said filter sleeve including means enabling removal for inspection, cleaning and reuse a substantial number of times.

7. The filter assembly of claim 6, wherein the housing endwall has an inner face and an outer face, the inner face for mating with the support frame and the outer face for engaging the internal combustion engine, the outer face having formed therein a plurality of concentric, circular gasket grooves surrounding the inlet port and the outlet port, the grooves for receiving a plurality of gasket means, whereby the outer face can be sealingly cooperable with a plurality of internal combustion engines.

8. The filter assembly of claim 7, wherein the outer face comprises two gasket grooves having predetermined sizes for receiving two O-ring sealing means.

9. The filter assembly of claim 6, wherein the outlet port comprises an internally threaded nipple projecting through the housing endwall, and the endwall further comprises a plurality of inlet ports spaced about the nipple, and the inner face of the endwall comprises central projection means extending interiorly for mating in a snug conforming fit with the support frame, the frame being tapered where it meets the inner face to not obstruct the inlet ports.

10. The filter assembly of claim 9, wherein at least one end of the frame is chamfered to enhance the mounting or demounting of the filter sleeve on the frame.

11. The filter assembly of claim 9, further comprising at least one threaded insert means for insertion into the nipple, the threaded insert means having an internally threaded bore therein, whereby the outlet port size can be varied to be cooperable with a plurality of internal combustion engines.

12. The filter assembly of claim 9, wherein the inlet ports are oval shaped, whereby the rate of oil flow may be enhanced.

13. The filter assembly of claim 6, wherein the housing further comprises a plurality of spaced apart cooling fins positioned lengthwise on the exterior of the housing sidewall.

14. The filter assembly of claim 6, wherein the valve means further comprises means for changing the predetermined value of oil pressure at which the valve means is operative to provide the passageway from the annular chamber to the central cavity.

15. The filter assembly of claim 6, wherein the filter sleeve comprises a flexible screen having a plurality of openings therein for permitting oil flow from the annular chamber to the central cavity.

16. An automotive filter assembly comprising: means for attachment to an internal combustion engine, said assembly including means enabling cleaning for reuse, including, (a) a cylindrical housing comprising aluminum and having a longitudinal axis, a tubular sidewall, and an endwall, the endwall having an internally threaded oil outlet port aligned with the longitudinal axis for mounting the filter on the engine and for returning filtered oil to the engine, the endwall further having formed therein a plurality of oval oil inlet ports spaced uniformly around the outlet port for receiving oil to be filtered from the engine, the endwall further having an outer portion comprising two circular, concentric O-ring seal members surrounding the oil inlet ports and the oil outlet ports for sealingly cooperating with a plurality of engines, the housing further comprising a plurality of external cooling fins positioned lengthwise on the exterior of the housing sidewall;

(b) a filter sleeve removably mounted concentrically inside the housing, the sleeve having a predetermined size and shape for forming an annular chamber inside the housing in communication with the plurality of oil inlet ports and a central cavity in communication with the outlet port, the sleeve comprising a flexible screen having openings therein for permitting the flow of oil from the annular chamber to the central cavity, the openings having a predetemined size so as to filter the oil, said filter sleeve including means for enabling cleaning a substantial number of times;

(c) a substantially rigid cylindrical frame comprising injection molded plastic for removably positioning concentrically within the housing to support the filter sleeve thereupon, the frame comprising a section of a hollow cylinder having a wall portion with an inner surface and an outer surface, the outer surface for abutting the filter means, the wall portion comprising a plurality of spaced apart ribs parallel to the cylinder axis, the ribs being spaced around the circumference of the cylinder to form an equal number of lengthwise slots therebetween, said slots extending through the wall portion from the outer surface to the inner surface and providing a plurality of passageways through the wall portion, the ribs being thicker adjacent the inner surface than adjacent the outer surface, whereby the slots are wider adjacent the outer surface than adjacent the inner surface to enhance the flow of oil through the filter sleeve from the annular chamber into the central cavity, the frame having a first end for mating in a snug conforming fit with a central projection on an inner portion of the endwall surrounding the oil outlet port and extending into the central chamber, the first end having a predetermined shape so as not to obstruct the plurality of the oil inlet ports, at least one end of the frame having a beveled edge to enhance the mounting of the filter screen thereon;

(d) a bypass valve for mating in a snug conforming fit with a second end of the frame and the housing sidewall opposite the housing endwall, the bypass valve being normally closed and being responsive to a predetermined value of pressure of the oil in the annular chamber to open to provide an alternate path from the annular chamber to the central chamber; and (e) a circular endcap for removably mounting on the tubular sidewall of the housing to retain the screen, the frame, and the valve inside the housing, the bypass valve having aperture means for permitting the passage of oil from the annular chamber to a cavity in the endcap, the endcap cavity being in liquid communication with the valve means, said endcap including means enabling removal thereof, said filter sleeve including means for enabling removal for inspection, cleaning, and reuse a substantial number of times.

17. The liquid filter assembly of claim 1, further comprising a plurality of gasket means for abutting the housing endwall for permitting the filter to be sealingly cooperable with a plurality of connecting configurations.

* * * * *